United States Patent
Pickl et al.

(10) Patent No.: US 8,245,570 B2
(45) Date of Patent: Aug. 21, 2012

(54) METHOD FOR MONITORING PERFORMANCE TEST STANDS HAVING AT LEAST ONE LOAD ASSEMBLY

(75) Inventors: Gerhard Pickl, Graz (AT); Martin Schmidt, Langen (DE); Martin Walcher, Kumberg (AT); Stefan Kanya, Gleisdorf (AT)

(73) Assignee: AVL List GmbH, Graz (AT)

( * ) Notice: Subject to any disclaimer, the term of this patent is extended or adjusted under 35 U.S.C. 154(b) by 388 days.

(21) Appl. No.: 12/453,890

(22) Filed: May 26, 2009

(65) Prior Publication Data

US 2010/0005875 A1 Jan. 14, 2010

(30) Foreign Application Priority Data

May 26, 2008 (AT) .................. GM299/2008

(51) Int. Cl.
*G01M 19/00* (2006.01)
(52) U.S. Cl. ................................................ 73/116.01
(58) Field of Classification Search .............. 73/116.01, 73/116.02, 116.05, 116.06, 116.07
See application file for complete search history.

(56) References Cited

U.S. PATENT DOCUMENTS

| | | | | |
|---|---|---|---|---|
| 5,986,545 A * | 11/1999 | Sanada et al. | .................. | 340/439 |
| 6,577,973 B1 * | 6/2003 | Freitag | ............................. | 702/85 |
| 6,598,467 B1 * | 7/2003 | Schoggl et al. | ............ | 73/116.06 |
| 6,651,493 B2 * | 11/2003 | Myers et al. | ................ | 73/116.05 |
| 7,610,799 B2 * | 11/2009 | Sugita | ......................... | 73/114.15 |
| 7,849,734 B2 * | 12/2010 | Moritani et al. | ........... | 73/116.05 |

FOREIGN PATENT DOCUMENTS

DE 2338392 2/1975

OTHER PUBLICATIONS

English Abstract of DE 2338392.

* cited by examiner

*Primary Examiner* — Eric S McCall
(74) *Attorney, Agent, or Firm* — Dykema Gossett PLLC (57) ABSTRACT

A method for monitoring performance test stands having at least one load assembly, which is coupled to a test subject, such as an internal combustion engine, vehicle drive, or drive train, includes ascertaining multiple, possibly derived parameters, which characterize the current state of the test stand, and evaluating them automatically in regard to the stability of the operating state of the test stand. In order to allow reliable cognition of instabilities in performance test stands of greatly varying configurations in the typical control modes and the reliable online monitoring of the stability of the control circuits on performance test stands in real time with CPU use which conserves resources as much as possible, the standardized parameters are weighted and consolidated into a single index which is characteristic for the current state, and this index is provided for the display and/or as a control variable for the real-time test stand controller.

25 Claims, 7 Drawing Sheets

METHOD FOR MONITORING PERFORMANCE TEST STANDS HAVING AT LEAST ONE LOAD ASSEMBLY

BACKGROUND OF THE INVENTION

1. Field of the Invention

The invention relates to a method for monitoring performance test stands having at least one load assembly which is coupled to a test subject, such as an internal combustion engine, vehicle drive, or drive train, comprising the ascertainment of multiple, possibly derived parameters which characterize the current state of the test stand, and their automated evaluation in regard to the stability of the operating state of the test stand, and a performance test stand having at least one load assembly which is coupled to a test subject, such as an internal combustion engine, vehicle drive, or drive train, also having a test stand controller, possibly a higher-order test stand automation, and an analysis unit for ascertaining multiple, possibly derived parameters which characterize the current state of the test stand, and their automated evaluation in regard to the stability of the operating state of the test stand.

A test stand configuration, comprising an internal combustion engine as the test subject, for example, which is coupled to a load assembly, is fundamentally oscillatory because of its mechanical construction, because it has at least one torsion-elastic section and/or one torsion-elastic element in each case. The load assembly may comprise one or more load machines, which may operate connected in series or in parallel via intermediate gears and/or cumulative gears. For example, a connection shaft—in particular in engine test stands—acts between the load assembly and the test subject as the torsion-elastic element, for example, also a half-axis on a drive train, to which the load assembly may be coupled directly. However, the torsion-elastic element may also be inside the test subject and/or the load assembly. A measuring flange also represents a torsion-elastic element in principle. The mechanical test stand configuration may therefore be simulated by a multi-mass spring damper system. Upon specific excitation, this construction may become unstable and trigger mechanical destruction of individual components and/or corrupt the measurements. In order to allow secure, automatic operation, possible instabilities are to be recognized early, so that countermeasures may be triggered by the automation system and/or control system of the test stand. However, in the event of manual operation by inexperienced test stand operators, it is also necessary to recognize occurring instabilities automatically to ensure the operational security.

The object of the present invention is therefore to allow reliable recognition of instabilities in performance test stands of greatly varying configurations in the typical control modes and reliable online monitoring of the stability of the control circuits on performance test stands in real time with CPU use which preserves resources as much as possible.

2. Summary of the Invention

To achieve this object, the method is characterized according to the invention in that every parameter is standardized, the standardized parameters are weighted and consolidated into a single index which is characteristic for the current state, and this index is provided for the display and/or as a control variable for the real-time test stand controller. Therefore, an easily interpretable variable for the system stability is already provided in manual operation, in that, for example, a defined stability index is provided, independently of the test stand configuration, between 0 for stable and 100 for unstable. After the test stand configuration and thus the system behavior are not precisely known and the computing possibilities are restricted, exclusively signal-supported methods are used for the monitoring. Therefore, existing measuring and control variables such as engine speed, torque, pedal value setting (corresponding to the gas pedal setting in the vehicle), or braking speed are preferably used as parameters. An optimum method use is generated for the particular standard control mode and/or test mode. Because of the standardization, a reliable and simple recognition on a uniform basis is ensured in every test stand configuration. This solution according to the invention may be applied for test modes subjects which are fundamentally arbitrary, for example, for an internal combustion engine, for vehicle drives of all types, including electric motors and/or hybrid drives, or for drivetrains.

It is preferably provided that the weighting of the standardized parameters is performed as a function of the operating mode of the test stand. The test mode and the control mode determine the operating mode.

A simple variant, which nonetheless results rapidly in good stability information, provides that the standard deviation is determined over a defined period of time for detected parameters of the test stand or their chronological derivative.

Furthermore, it is advantageously provided that detected parameters of the test stand may be restricted to defined frequency ranges.

According to an advantageous variant of the method, after the sampling and before the ascertainment of the particular parameter, downsampling is applied, the resulting sampling being adapted to the particular frequency range of interest.

According to a further advantageous variant, a frequency analysis may be applied to detected parameters of the test stand.

According to a further embodiment of the invention, it may be provided that an index about the performance implemented in the connection shaft is ascertained from detected parameters of the test stand.

Various variants are conceivable concerning the selection of the parameters used for the stability monitoring, so that, for example, in the idle mode and/or upon specification of a torque of the load assembly, a torque signal is recorded and a characteristic parameter is obtained from a frequency analysis.

On the other hand, it may also be provided that upon specification of a speed of the load assembly, a torque signal is recorded and a characteristic parameter is obtained by determining the standard deviation.

A variant is also possible in which, in the idle mode and/or upon specification of a torque of the load assembly, the speed of the test subject is recorded and a characteristic parameter is obtained by determining the standard deviation.

Furthermore, it may be provided that in idle or upon specification of a torque of the load assembly in stationary operating points, the speed of the load assembly is recorded and a characteristic parameter is obtained by determining the standard deviation.

Another variant provides that upon specification of a speed of the load assembly, a characteristic parameter is obtained from a frequency analysis of this speed.

In all stationary operating points, according to a further embodiment, the manipulated variables for the load assembly and/or the test subject may be monitored and a characteristic parameter is obtained by determining the standard deviation.

It is advantageously provided that to standardize the torque analysis result, a torque characteristic of the load assembly is used.

On the other hand, it may be provided that to standardize the speed analysis result of the load assembly, a speed characteristic of the load assembly is used.

Advantageously, a speed characteristic of the test subject is used to standardize the analysis result of the speed of the test subject.

In contrast, it is expedient if a characteristic of the load assembly is used to standardize the manipulated variable analysis result of the load assembly.

According to a further variant of the invention, it may be provided that the angular acceleration of the load assembly is ascertained and its standard deviation is obtained as the characteristic parameter.

It is advantageous if physical characteristics of the load assembly are used to standardize the standard deviation of the angular acceleration.

Furthermore, an embodiment of the method may be provided, according to which the performance implemented in the connection shaft is obtained as a characteristic parameter.

An advantageous embodiment provides that a characteristic of the load assembly is used to standardize the performance implemented in the connection shaft.

For all of the above-mentioned variants, it may be expedient if all characteristics of the test stand and/or the test subject required for the method are taken from the parameterization of the test stand in the test stand controller and/or the values predetermined in the test stand automation. Therefore, for every test stand configuration, the simple and reliable recognition of instabilities may be ensured automatically and without additional parameterization effort.

Furthermore, it is advantageously provided that the index of the test stand controller is provided and a predefined reaction is triggered automatically as a function of this index. Via the automatically configurable reaction of the higher-order automation system by corresponding actions, which are to be defined by the test stand operator, such as engine stop, cold-running or idle operation, to the stability index, the test stand system may be reliably protected from damage. The index may alternately be transmitted via an analog value such as voltage, current strength, frequency, or the like, or as a digital value. A direct connection of the unit ascertaining the index to the automation system or the test stand controller may also be provided, as well as optionally a bus system, to which both components are connected.

To solve the problems stated at the beginning, a performance test stand is characterized according to the invention in that in the test stand automation, preferably in the test stand controller, a module is implemented, in which each parameter is standardized according to a method according to one of the preceding paragraphs, the standardized parameters are weighted and consolidated into an index characteristic for the current state, which is available for the display and/or as a control variable for the real-time test stand controller. The cited module may be implemented as software or hardware, possibly also in analog technology.

A display is advantageously provided for the index.

The invention is explained in greater detail on the basis of preferred exemplary embodiments in the following description.

DETAILED DESCRIPTION OF THE PREFERRED EMBODIMENTS

Figure 1:
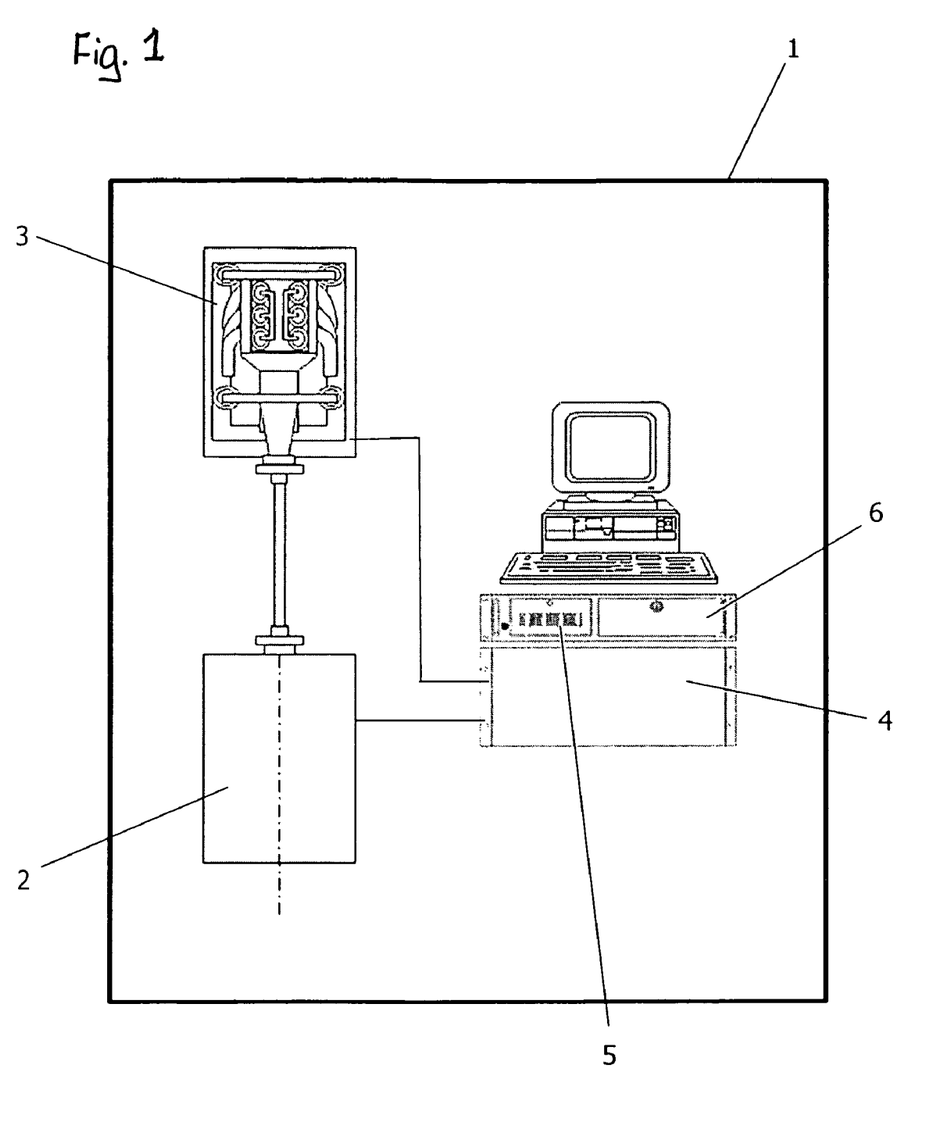
FIG. 1 illustrates the apparatus of the invention.

FIG. 1 illustrates the inventive performance test stand 1, which includes a load assembly 2, a test subject 3, a test stand controller 4, an analysis unit 5 and module 6. The fundamental solution approach for the monitoring comprises the relevant test stand variables being analyzed and methods corresponding to the control mode and/or test mode being used for the analysis. Subsequently, the analysis results are standardized and the index is returned—with information about the system stability—to the test stand automation. Additional functionalities such as calculation of signal gradient, combustion frequency, etc., for example, but also signal routing, data conditioning measures, and setting of model parameters are necessary. In any case, the use of the individual methods is controlled according to the control mode and/or test mode of the test subject and the signals are routed appropriately for the analysis of the control variables. Characteristics of the test subject and the load assembly are used as the foundation for the standardization and the stability index is generated accordingly. During stationary test stand operation, it is desirable for the stability index to react sensitively to occurring instabilities, because of which methods suitable for this test mode are applied exclusively here.

Following Table 1 lists the methods which are preferably used:

| Method | Description | Possible use |
|---|---|---|
| STD | Calculation of the standard deviation (average time 1 second) | Stationary tests |
| TP-STD | Low-pass filtering of the STD input variable (average time 2 seconds) | Stationary tests |
| BP-STD | Bandpass filtering of the STD input variable (average time 0.24 seconds) | Stationary and ramps |
| DynoAcc | STD of the braking acceleration | Stationary and ramps |
| BP-FFT | Bandpass filtering of the FFT input variable | Stationary and ramps |
| Shaft loss calculation | With TP (Fg = 0.3 Hz) | Stationary and ramps |

Before the actual control of the methods is discussed, firstly the test stand variables and/or parameters are defined, to which the methods are applied. While for the shaft loss calculation and analysis of the braking acceleration, it is predetermined by their definition which variables are required for the analysis, the input variables of the STD methods and the FFT method from Table 1 may fundamentally be selected freely. Preferably, the relevant control variables of the engine test stand system, namely torque (MD), engine speed (N-Eng), and braking speed (N-Dyn) are used to monitor the test stand stability with the aid of the STD and FFT methods.

In order to obtain the more sensitive stability evaluation during stationary test stand operation, in addition, the manipulated variable of the engine controller (Y-Eng—pedal value) and that of the brake controller (Y-Dyn—as a function of the brake type) are analyzed in this test mode.

The method (FFT or STD) which is finally applied to the cited test stand variables and/or parameters is in turn a function of the operated control mode. Preferred selections are listed in following Table 2. It is always ensured that at least the torque signal and a speed signal (engine or load assembly) are analyzed for possible instabilities during activated real-time monitoring. (The variables identified by asterisks * only in stationary test stand operation).

TABLE 2

| Control mode | Monitored test stand variables | | | | |
|---|---|---|---|---|---|
| | MD | N-Eng | N-Dyn | Y-Eng | Y-Dyn |
| Idle | BP-FFT | BP-STD | TP-STD* | STD* | STD* |
| N/alpha n/MD n/x | BP-STD and TP-STD* | — | BP-FFT | STD* | STD* |
| Md/Alpha Md/n Md/x | BP-FFT | BP-STD | TP-STD* | STD* | STD* |

As Table 2 shows, the FFT method (BP-FFT) is always applied to the current control variable of the brake controller—the control variables corresponding to the control mode are specified in following Table 3.

TABLE 3

| Control mode | Load assembly | Test subject |
|---|---|---|
| Idle | — | Idle position |
| n/Alpha | Speed | Throttle valve position (pedal value) |
| Md/Alpha | Torque | Throttle valve position (pedal value) |
| n/Md | Speed | Torque |
| Md/n | Torque | Speed |
| n/x | Speed | Arbitrary variable |
| Md/x | Torque | Arbitrary variable |

The STD method having upstream bandpass filter always analyzes the opposing test stand variable, i.e., the torque in the event of braking speed control and the engine speed in the event of torque control by the brake controller. The property that at least the torque signal and a speed signal are analyzed during every monitored test mode (stationary and transient tests) is thus achieved.

The FFT methods are therefore restricted to the control variables of the brake controller, because the load assembly may introduce critical oscillations having higher frequencies (also greater than the idle combustion frequency) into the test stand system and these oscillations are not damped by the filtering in the FFT methods, in contrast to the BP filter of the STD methods.

For the more sensitive analysis in stationary test stand operation, in addition, the TP-STD method is applied according to Table 2 and the manipulated variables are analyzed with the aid of the standard STD method. In stationary tests, for example, a varying pedal value specification (Y-Eng) at the test subject, for example, would already indicate undesired behavior, even if these manipulated variable changes were not recognizable in the speed and torque curves.

The control of the methods used is performed on the basis of two main criteria. These fundamentally decide in which state the online monitoring is located. On the one hand, it is determined by the currently used control mode whether or not the monitoring is active, because control modes which do not correspond to the standard control modes of preceding Table 3, such as start, stop, road inclination/pedal value, etc., are not monitored.

On the other hand, the current test mode is determined by the target value slopes of the test stand controller (brake and engine). If the gradients of the two target values are zero, the test stand is operated stationary and all methods from Table 2 are applied.

However, if one of these variables is not equal to zero, it is decided on the basis of the slope value whether it is transient or dynamic operation. If it is below a defined limit (e.g., speed slope less than ±500 rpm/s), transient operation prevails, and the methods are applied which exclusively function during ramps. Above the limit (dynamic operation), the methods are disabled, i.e., no stability monitoring of the test stand controller is performed.

Figure 2:
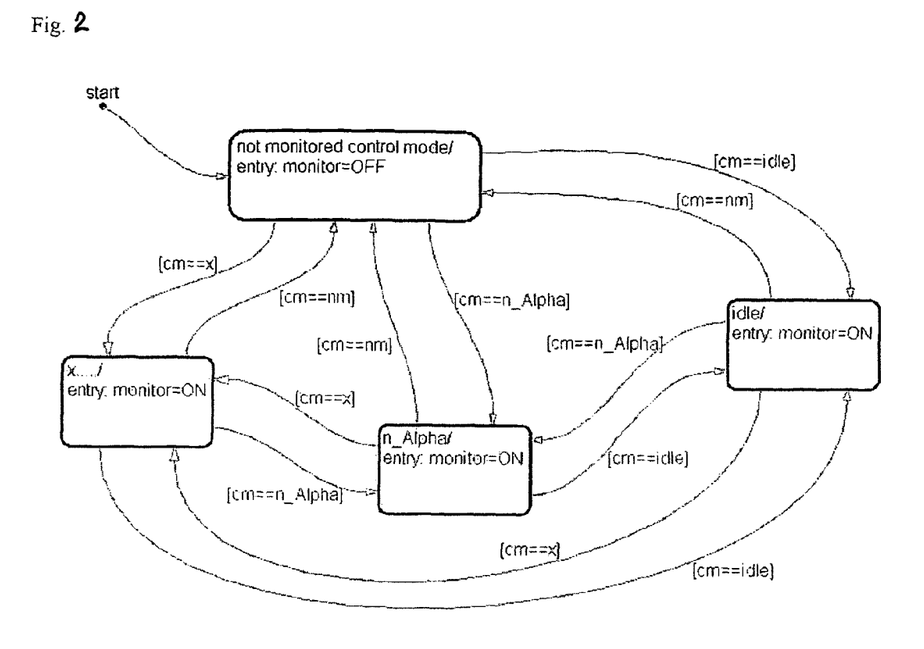
FIG. 2 shows a state diagram for analyzing the current control mode.
Figure 3:
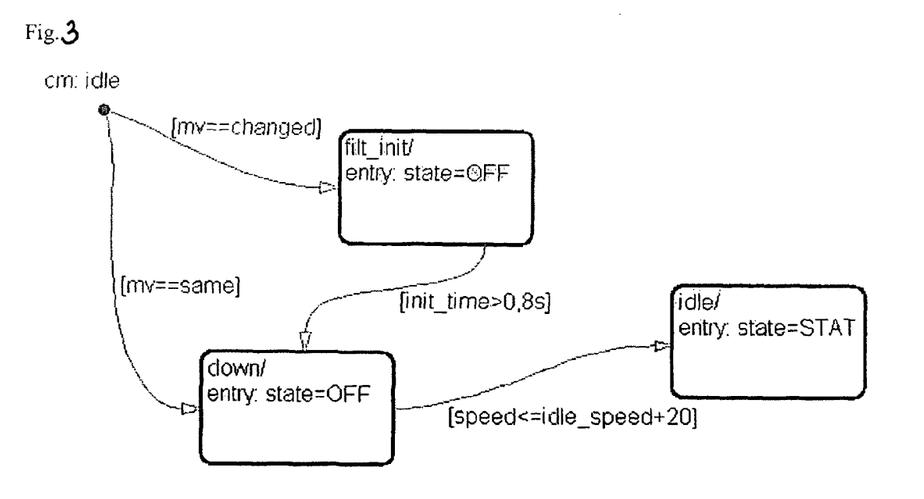
FIG. 3 shows the state diagram for the monitoring during idle.

In order to illustrate the handling of the method controller, a further description is performed on the basis of state diagrams, which are shown in FIGS. 1 through 3, and in which the special analysis of the corresponding control mode was already also discussed.

In FIG. 1, the analysis of the current control mode (control mode: cm) is described using the illustrated state diagram. The starting point is always the starting action of the internal combustion engine, because it is performed in a non-monitored control mode (not monitored: nm). One generally differentiates between the individual standard control modes and, in general, the non-monitored control modes. In FIG. 1, only the control modes idle and n/Alpha are explicitly shown, all further monitored control modes from Table 3 are indicated by an x. Before the methods may be activated with enabled monitoring, the assignment of the test stand variables and/or parameters to be monitored to the methods BP-FFT, BP-STD, and TT-STD is performed according to Table 2. In all other methods, the variables are permanently assigned.

With enabled online monitoring, the further analysis of the active control mode is performed, in the fundamental performance, differentiation being made between the control mode idle and the further control modes (see FIG. 2 and FIG. 3).

If the monitored variables and/or parameters which are not permanently associated with the methods are changed over upon a control mode change, the corresponding filters are also occupied using other input signals. This means that the filters of the BP-FFT, BP-STD, and TP-STD methods must be initialized because of the group runtime. As a function of the filter having the longest initialization time, all methods are disabled during this procedure (filt_init) (see FIG. 2 and FIG. 3 again).

FIG. 2 shows that upon the change to the control mode idle, it is first checked whether the monitored variables and/or parameters have changed in relation to the previously used control mode. If not, the change to the state engine slowdown (down) is performed immediately and no filter initialization (filt_init) is awaited. In this state, the internal combustion engine slows down from the current operating point (e.g., 3500 rpm and 60% pedal value) to the idle point. After the test subject behavior is undefined in engine slowdown, the monitoring is first activated if the current speed has approximately reached the idle speed. This state (idle) may only be left again by a control mode change.

The case imaged in FIG. 3 shows those states in which the further control modes from Table 3 may be reached. As already described for idle operation, the decision is first performed whether or not a filter initialization is necessary. The states then change between stationary, transient, and dynamic depending on the target value slope and the methods are used according to Table 1 and Table 2.

After a target value change—i.e., if the slopes of the target variable (dem_k) of the brake controller and the engine controller are zero again—a predefined time (still_time) is awaited, until all methods are enabled again. This time is a function of the test stand configuration and the control quality in practical application. However, to allow the online monitoring required in the statement of the object independently of the configuration, this waiting time is defined using a generally valid value of 1.5 seconds.

This time and the limits for the individual target value slopes are made accessible to authorized test stand operators, however, and may be altered for the runtime of the method in a defined range. The preset limiting values for the diverse target value slopes are 500 rpm for the speed specifications, 100 Nm/s for the torque, 10%/s for the pedal value specification, and 100/s for the free variable x.

The states during test stand operation using a monitored control mode result from FIGS. 2 and 3. The methods are controlled in accordance with the current state. A fundamental differentiation is made between two control signals. Upon the control signal EIN (enable), the methods are activated and, for example, the input data of the STD methods are written in the data buffer for the averaging. With the exception of the shaft loss calculation (due to the low computing time), the individual methods do not yet deliver an output variable. The remaining methods are first calculated by the second control signal (trigger). This has the advantage that the computing time in a model cycle is reduced by a possible sequential activation of the calculations and may thus be defined and does not result arbitrarily.

Figure 4:
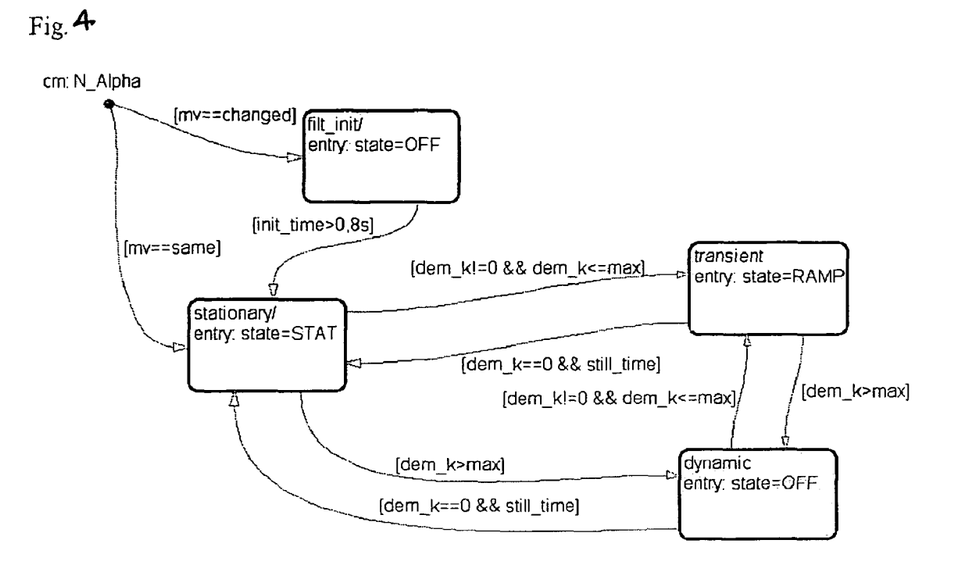
FIG. 4 shows the state diagram for the monitoring of the further control modes.
Figure 5:
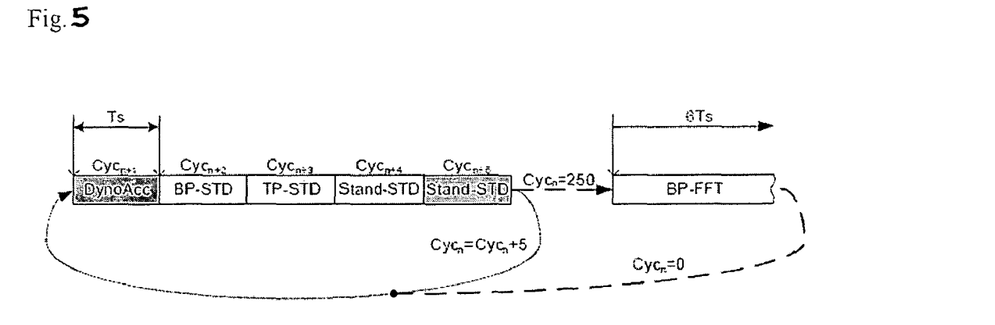
FIGS. 5 and 6 illustrate the principle of triggering the methods during stationary and transient test stand operation (ramps), respectively.

The triggering of the methods in stationary and in transient test stand operation (ramps) is shown in FIGS. 4 and 5, respectively, it being shown that the calculations (up to the shaft loss calculation) are initiated sequentially. However, the BP-FFT method is only calculated every 250 cycles (0.5 seconds) and preferably, for reasons of computing performance, partitioned onto 6 cycles in each case.

Figure 6:
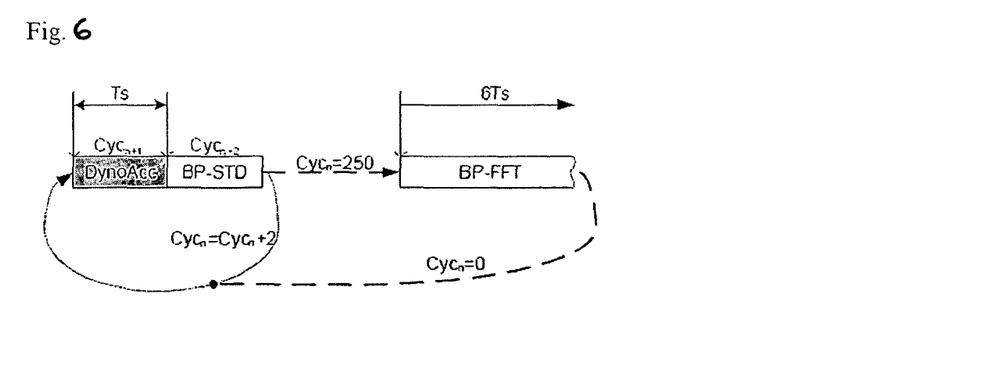
Figure 7:
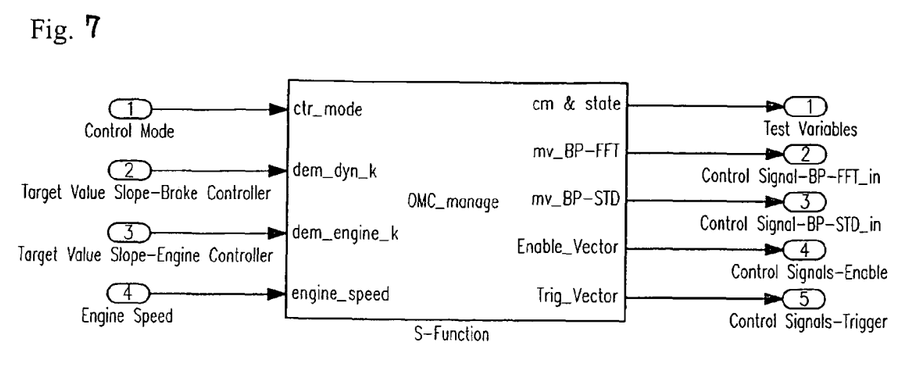
FIG. 7 is an illustration of the S-function block for controlling the methods.

The implementation of the described functions is performed via a software function (S-function (OMC_manage)), which assumes the complete control of the methods on the basis of the previously defined input variables. The implemented S-function block and the necessary input variables, output variables, and parameters are shown in FIGS. 6 and 7. The parameters shown in FIG. 7 may, with the exception of the idle speed (which is input automatically in accordance with the test stand parameterization), also be changed if needed at the runtime of the real-time application by an authorized test stand operator.

Figure 8:
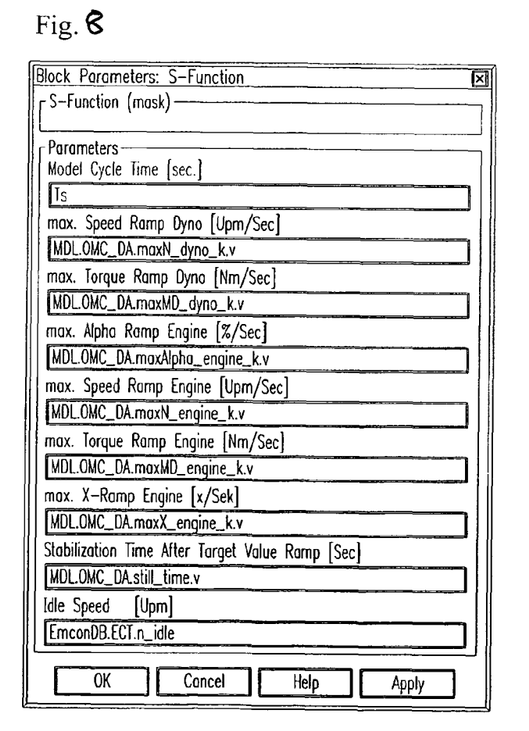
FIG. 8 shows the parameters for this S-function block.
Figure 9:
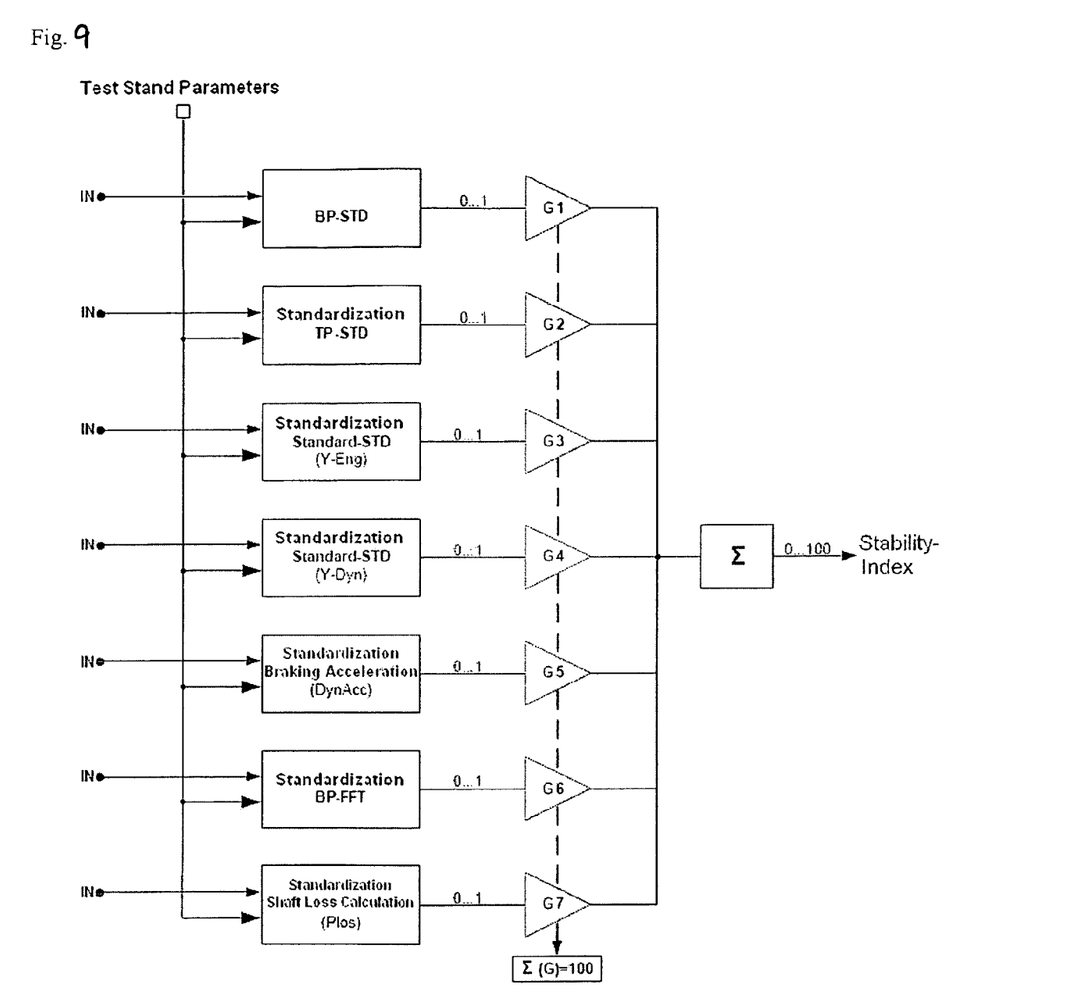
FIG. 9 is an illustration of the concept for calculating the stability index.

To calculate the online stability index, firstly the individual results of the methods are standardized, then weighted, and finally provided in the form of a system variable to the test stand system as the stability index as a sum. The concept is shown for this purpose in FIG. 8. As shown here, the standardization of the individual results from the methods is performed on the basis of test stand parameters (base variables of the standardization). During the development, only the parameter names are fixed (these are identical for many test stands), and not the values behind them. These values first result upon the application on the particular engine test stand through the characteristics of the test stand configuration and are input automatically. Depending on the test stand configuration, different values result as the basis of the standardization, whereby no additional parameterization is necessary in the event of different engine test stands and/or configurations (see FIG. 9 for this purpose).

A value range of the characteristic from 0 for stable up to 100 for unstable is achieved by the standardization of the individual method results from 0 to 1 and the subsequent weighting—the sum of the weighting results as 100. No limiting is performed, because the value 100 represents the maximum value according to the definition of the individual standards and does not specify the maximum possible instability. In addition, it may be recognized from the concept that those methods which are exclusively applied in stationary operation reduce the stability index in the event of transient test modes by their weighted component (see Table 4 in this regard).

TABLE 4

| Method | Weighting | Notes |
| --- | --- | --- |
| BP-STD | 15% | Above all in the resonance range |
| TP-STD | 15% | Instabilities with lower frequency |
| STD (Y-Eng) | 8% | For more sensitive analysis in stationary operation |
| STD (Y-Eng) | 7% | For more sensitive analysis in stationary operation |
| Braking acceleration (DynoAcc) | 20% | Above all in system-critical states |
| BP-FFT | 20% | Recognizes oscillations in the entire frequency range (1-60 Hz) |
| Shaft losses (Plos) | 15% | Upon torsion of the shaft connection |

This is desirable on the one hand (more sensitive analysis in stationary operation), but makes a comparison of the stability index impossible in the different test modes (stationary and transient).

The reference values of the individual base variables used for the standardization have largely resulted from practical test stand application, evaluation of preceding measured data in unstable operation, and corresponding experiential reports. The procedure of standardization is illustrated once again on the basis of FIG. 9. As disclosed here, an output signal of one is obtained if the input signal corresponds to the standardization value. If the result of the corresponding methods lies above the standardization value, the output signal is greater than one and is above the maximum value defined for this method. The stability index may thus exceed the value 100.

Figure 10:
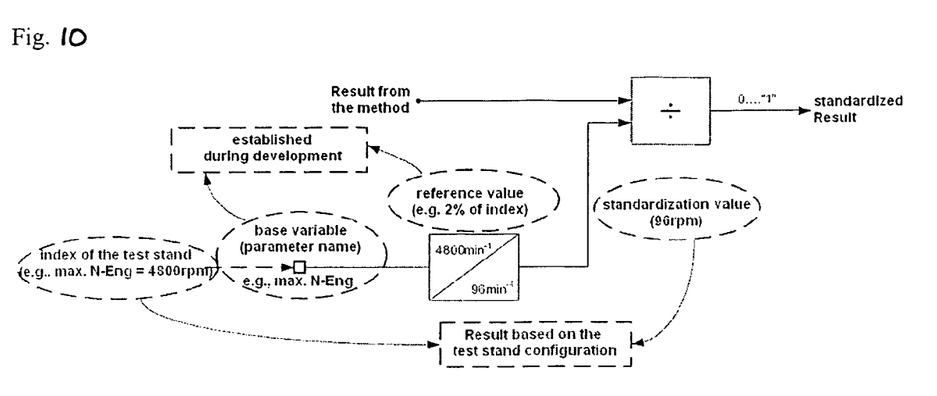
FIG. 10 shows an example of a standardization procedure on the example of the maximum engine speed.

The standardization of the result from the calculation of the standard deviation of the bandpass-filtered input variable is performed at the maximum speed or at the maximum torque of the test subject depending on the control mode. Following Table 5 shows the reference values applied for this purpose, while the associated software model is shown in FIG. 10.

TABLE 5

| Base variable | Reference value | Notes |
| --- | --- | --- |
| Maximum engine speed | 2% | For the control modes: idle, Md/Alpha, Md/n, and Md/x |

TABLE 5-continued

| Base variable | Reference value | Notes |
|---|---|---|
| Maximum engine torque | 40% | For the control modes: n/Alpha, n/Md, and n/x |

The standardization of the output variable of the TP-STD method is performed depending on the control mode either at the maximum speed or the maximum torque of the load assembly. In the following Table 6, the base variables and reference values applied for this purpose are shown.

TABLE 6

| Base variable | Reference value | Notes |
|---|---|---|
| Maximum braking speed | 1% | For the control modes: idle, Md/Alpha, Md/n, and Md/x |
| Maximum braking torque | 20% | For the control modes: n/Alpha, n/Md, and n/x |

The reference values from Table 6 only have half of the value of those from Table 5. This is because the characteristics of the load assembly are typically significantly above those of the test subject. In addition, the TP-STD method is only applied in stationary tests and is therefore to react more sensitively to instabilities. The software model for the standardization of the TP-STD output variable fundamentally corresponds to that of FIG. 10 and is therefore not explicitly shown.

The STD method is used twice, in each case on the manipulated variable of the brake and engine controllers. The results of this method allow a more sensitive stability evaluation in stationary test stand operation. The standardization of the output values is performed in accordance with the two methods shown up to this point, only one base variable being used in each case, because the manipulated variables are identical in each control mode.

For the standardization of the STD method (Y-Eng), 50% of the maximum manipulated variable engine is used as the reference value, this manipulated variable of the engine corresponding to the pedal value specification. In contrast, in case of the standardization of the STD method (Y-Dyno), a differentiation is made between passive and active braking. Starting from the maximum manipulated variable, 50% is selected in passive braking and 100% is selected in active braking here, because the manipulated variable may assume positive and also negative values. The standardized output variables of this method practically cannot become greater than one due to these reference values. Active load assemblies may output positive and also negative control values in the entire control range, and the reference variable is therefore defined in these assemblies as 100% of the maximum manipulated variable.

The standardization of the method for evaluating the speed acceleration of the load assembly (DynoAcc) is not performed on the basis of a percentage value in relation to an index, but rather results from the maximum possible acceleration predetermined by the inertia and the maximum torque of the load assembly. From the definition $$M = J\alpha$$

M ... torque [Nm]

J ... moment of inertia [Nms$^2$]

α ... angular acceleration [s$^{-2}$]

it follows, by corresponding conversion for the maximum speed slope in [rpm] per sampling interval $T_s$:

$$\frac{\Delta n_{max}}{T_s} = \frac{30}{\pi} \frac{M_{Dyn_{max}}}{J_{Dyn}} T_s$$

Figure 11:
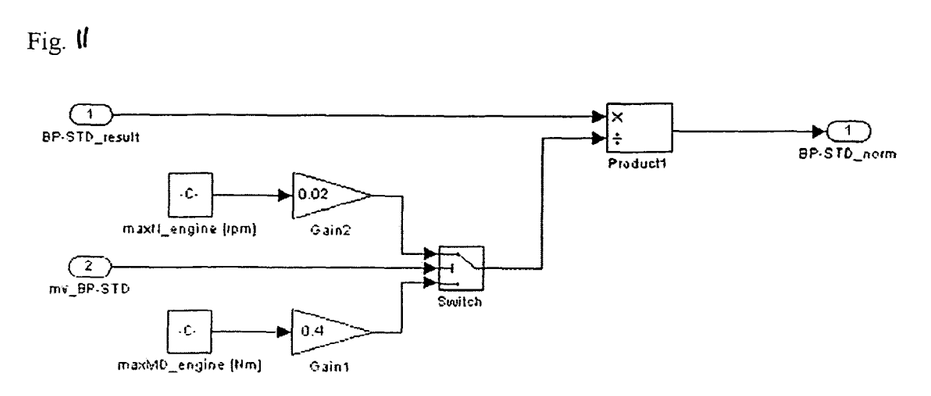
FIG. 11 is an illustration of a software model for standardizing the BP-STD output variable.
Figure 12:
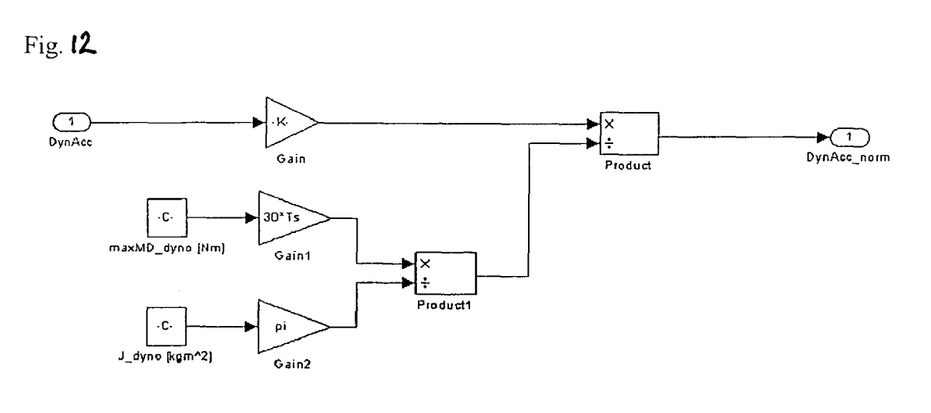
FIG. 12 is an equivalent illustration of the software model for standardizing the DynoAcc method.

This standardization method does not consider the coupled test subject, but rather relates exclusively to the variables of the load assembly. The associated software model is shown in FIG. 11.

The DynoAcc method provides the standard deviation of the acceleration per model cycle. Through the correction of the input value by the factor √2—constant, changing accelerations in unstable test stand operation typically approximately correspond to a sinusoidal shape—the maximum acceleration value may be concluded. The standardized starting value at maximum possible speed acceleration of the load assembly is thus approximately restricted to the value one.

According to the current control variable of the brake controller, the maximum speed or the maximum possible torque of the load assembly is used as the reference variable for the standardization of the bandpass-filtered Fourier transform method. The reference values resulting from the experiments are specified in following Table 7.

TABLE 7

| Base variable | Reference value | Notes |
|---|---|---|
| Maximum braking speed | 1% | For the control modes: n/Alpha, n/Md, and n/x |
| Maximum braking torque | 33% | For the control modes: idle, Md/Alpha, Md/n, and Md/x |

For the standardization of the output value (absolute value variable) of the method for calculating the shaft losses, the rated performance of the load assembly installed on the engine test stand is used as the base variable, because only the moment of inertia is known as the characteristic of the shaft connection. Because of the different types of embodiments, in general, the maximum shaft loss performance of the particular shaft generally cannot be concluded. The evaluations of test stand data have empirically shown, however, that a reference value of 0.1% of the rated performance of the load assembly provides reasonable results in practical application.

The weighting of the standardized variables in percent is essential for the calculation of the stability index. It results from the evaluation of the individual methods for monitoring the test stand stability. It is taken into consideration, inter alia, that methods which may unequivocally recognize critical instabilities (e.g., shaft loss calculation or evaluation of the speed acceleration) are weighted more strongly than methods which are exclusively applied in stationary test stand operation. The values for the weighting resulting from the practical application of the methods have already been specified in Table 4.

In the overall model, the core functions explained up to this point are consolidated, Table 8 giving an overview of how many variables contribute to the stability index.

The MPE parameters listed in Table 8 may optionally be changed by an authorized test stand operator. The values in parentheses are normally used.

Through the standardization of the methods to the particular characteristics of the current test stand configuration, additional necessary parameterization may be dispensed with.

Individual, simple parameters for the control and analysis of the methods may only be changed by an authorized test stand operator at the runtime, however. This may be necessary above all if the configuration does not correspond to the standard.

The evaluation in the event of target value ramps was made possible by the use of bandpass filters and special methods such as shaft loss calculation and differentiation of the speed. The more sensitive evaluation of the stability index during stationary operation is achieved by the additional evaluation of the manipulated variables.

A significant reduction of the CPU workload is thus also possible, with advantageously extensively constant and predictable computing time.

TABLE 8

| System input variables | Number | Notes |
|---|---|---|
| System variable | 19 | Control, measuring, and state variables: e.g., current control mode, target, actual, and manipulated values of the individual control modes, braking type, torque measured values, etc. |
| Test stand parameters | 11 | Characteristics of the test stand configuration: e.g., idle speed, cylinder number, rated performance of the load assembly, maximum engine speed, maximum torque of the load assembly, etc. |
| MPE parameters | 14 | RTA parameters, which may optionally be changed at the run time: torque signal to be analyzed OMC_manage S-function: limits for the recognition of transient operation (maxN_gradient, maxMD_gradient, . . . ) stabilization time after ramps (1.5 s) FFT analyzer S-function: minimum frequency to be analyzed (1 Hz) maximum frequency to be analyzed (60 Hz) lower limit for critical f-range (10 Hz) upper limit for critical f-range (22 Hz) additional weighting of the output variable (20%) |

The invention claimed is:

1. A method for monitoring performance test stands having at least one load assembly, which is coupled to a test subject, comprising the steps of:
   (a) ascertaining multiple parameters which characterize a current state of the test stand from existing measuring and control variables,
   (b) feeding said parameters to an automatic analysis unit for evaluation of said parameters in regard to the stability of an actual operating state of the test stand,
   (c) standardizing every parameter,
   (d) ascertaining a single stability index number which is characteristic for the current state of the test stand by weighting the standardized parameters and consolidating them into a single index number, and
   (e) providing said index number for display and/or as a control variable for a real-time test stand controller.

2. The method according to claim 1, wherein the weighting of the standardized parameters is performed as a function of the operating mode of the test stand.

3. The method according to claim 1, wherein the standard deviation over a defined period of time is determined from detected parameters of the test stand or their chronological derivation.

4. The method according to claim 3, wherein said detected parameters of the test stand are restricted to defined frequency ranges.

5. The method according to claim 4, wherein after sampling and before the ascertainment of the particular parameter, downsampling is applied, the resulting sampling being adapted to the particular frequency range of interest.

6. The method according to claim 1, wherein a frequency analysis is applied to detected parameters of the test stand.

7. The method according to claim 1, comprises an index about the performance implemented in a connection shaft is ascertained from detected parameters of the test stand.

8. The method according to claim 1, including in the idle mode and/or upon specification of a torque of the load assembly, a torque signal is recorded and a characteristic parameter is obtained from a frequency analysis.

9. The method according to claim 1, wherein upon specification of a speed of the load assembly, a torque signal is recorded and a characteristic parameter is obtained by determining the standard deviation.

10. The method according to claim 9, including to standardize a torque analysis result, a torque characteristic of the load assembly is used.

11. The method according to claim 1, including in an idle mode and/or upon specification of a torque of the load assembly, the speed of the test subject is recorded and a characteristic parameter is obtained by determining the standard deviation.

12. The method according to claim 11, wherein to standardize the analysis result of the speed of the test subject, a speed characteristic of the test subject is used.

13. The method according to claim 1, including in idle or upon specification of a torque of the load assembly in stationary operating points, the speed of the load assembly is recorded and a characteristic parameter is obtained by determining a standard deviation.

14. The method according to claim 1, wherein upon specification of a speed of the load assembly, a characteristic parameter is obtained from a frequency analysis of this speed.

15. The method according to claim 14, wherein to standardize the speed analysis result of the load assembly, a speed characteristic of the load assembly is used.

16. The method according to claim 1, including in all stationary operating points, manipulated variables for the load assembly and/or the test subject are monitored and a characteristic parameter is obtained by determining a standard deviation.

17. The method according to claim 16, wherein to standardize the manipulated variable analysis result of the load assembly, a characteristic of the load assembly is used.

18. The method according to claim 1, wherein the angular acceleration of the load assembly is ascertained and a standard deviation thereof is obtained as a characteristic parameter.

19. The method according to claim 18, including to standardize the standard deviation of the angular acceleration, physical characteristics of the load assembly are used.

20. The method according to claim 1, wherein the performance implemented in a connection shaft is obtained as a characteristic parameter.

21. The method according to claim 20,
including to standardize the performance implemented in the connection shaft, a characteristic of the load assembly is used.

22. The method according to claim 1, wherein the test stand and/or the test subject required for the method are taken from values predetermined during the parameterization of the test stand in the test stand controller and/or the test stand automation.

23. The method according to claim 1, wherein an index of the test stand controller is provided and a predefined reaction is triggered automatically as a function of this index.

24. A performance test stand, comprising:
at least one load assembly which can be coupled to a test subject,
a test stand automation system, and
an analysis unit for ascertaining multiple parameters which characterize a current state of the test stand and for their automated evaluation in regard to the stability of a current operating state of the test stand,
wherein the test stand automation system includes a module in which each parameter is standardized, weighted and consolidated into a single stability index number characteristic of the current state, and which makes said stability index number available for display and/or as a control variable for a test stand controller.

25. The performance test stand according to claim 24, including a display for the stability index number.

* * * * *